US009531952B2

(12) United States Patent
Snavely et al.

(10) Patent No.: US 9,531,952 B2
(45) Date of Patent: Dec. 27, 2016

(54) EXPANDING THE FIELD OF VIEW OF PHOTOGRAPH

(71) Applicant: Google Inc., Mountain View, CA (US)

(72) Inventors: Keith Noah Snavely, Menlo Park, CA (US); Pierre Georgel, San Francisco, CA (US); Steven Maxwell Seitz, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/671,051

(22) Filed: Mar. 27, 2015

(65) Prior Publication Data

US 2016/0286122 A1    Sep. 29, 2016

(51) Int. Cl.
| | |
|---|---|
| G06K 9/32 | (2006.01) |
| G06K 9/46 | (2006.01) |
| G06K 9/68 | (2006.01) |
| H04N 5/232 | (2006.01) |
| G06K 9/62 | (2006.01) |
| G06T 7/00 | (2006.01) |

(52) U.S. Cl.
CPC ........ *H04N 5/23238* (2013.01); *G06K 9/4604* (2013.01); *G06K 9/6202* (2013.01); *G06T 7/0024* (2013.01); *G06K 2009/6213* (2013.01)

(58) Field of Classification Search
None
See application file for complete search history.

(56) References Cited

U.S. PATENT DOCUMENTS

| | | | | |
|---|---|---|---|---|
| 5,649,032 | A | * | 7/1997 | Burt ......................... G06K 9/32 348/588 |
| 6,075,905 | A | * | 6/2000 | Herman ................... G06K 9/32 348/588 |
| 6,657,667 | B1 | | 12/2003 | Anderson |
| 2003/0086002 | A1 | | 5/2003 | Cahill et al. |
| 2009/0128644 | A1 | * | 5/2009 | Camp, Jr. ............. G06T 3/4038 348/218.1 |
| 2011/0194761 | A1 | | 8/2011 | Wang et al. |
| 2013/0013578 | A1 | | 1/2013 | Yang et al. |
| 2014/0285516 | A1 | * | 9/2014 | Shulman ............ G01C 21/3647 345/629 |
| 2015/0036931 | A1 | | 2/2015 | Loui et al. |

(Continued)

OTHER PUBLICATIONS

Garg et al., "The Dimensionality of Scene Appearance", International Conference on Computer Vision (ICCV), 2009 retrieved at <http://grail.cs.washington.edu/projects/SceneAppearance/ICCV09.pdfl>.

(Continued)

*Primary Examiner* — Brian P Werner
(74) *Attorney, Agent, or Firm* — Lerner, David, Littenberg, Krumholz & Mentlik, LLP

(57) ABSTRACT

Aspects of this disclosure relate to generating a composite image of an image of and another image that has a wider field of view. After an image is selected, the visual features in the image may be identified. Several images, such as panoramas, which have wider fields of view than an image captured by a camera, may be selected according to a comparison of the visual features in the image and the visual features of the larger images. The image may be aligned with each of the larger images, and at least one of these smaller-larger image pairs may be generated as a composite image.

20 Claims, 7 Drawing Sheets

(56) References Cited

U.S. PATENT DOCUMENTS

2015/0145950 A1* 5/2015 Murphy ............ H04N 5/23238
  348/36

OTHER PUBLICATIONS

Kopf et al., "Deep photo: model-based photograph enhancement and viewing", Dec. 10, 2008 retrieved from http://research.microsoft.com/en-us/um/people/cohen/deep_photo.pdf.
Wang et al., "BiggerPicture: Data-Driven Image Extrapolation Using Graph Matching", Nov. 2014 retrieved from <https://users.cs.cf.ac.uk/Yukun.Lai/papers/biggerpicture.pdf>.
Zhang et al., "FrameBreak: Dramatic Image Extrapolation by Guided Shift-Maps", 2013 retrieved at <http://cs.brown.edu/~hays/papers/cvpr13_framebreak.pdf>.
International Search Report and Written Opinion for PCT Application No. PCT/US2016/023393 dated Jun. 3, 2016.

\* cited by examiner

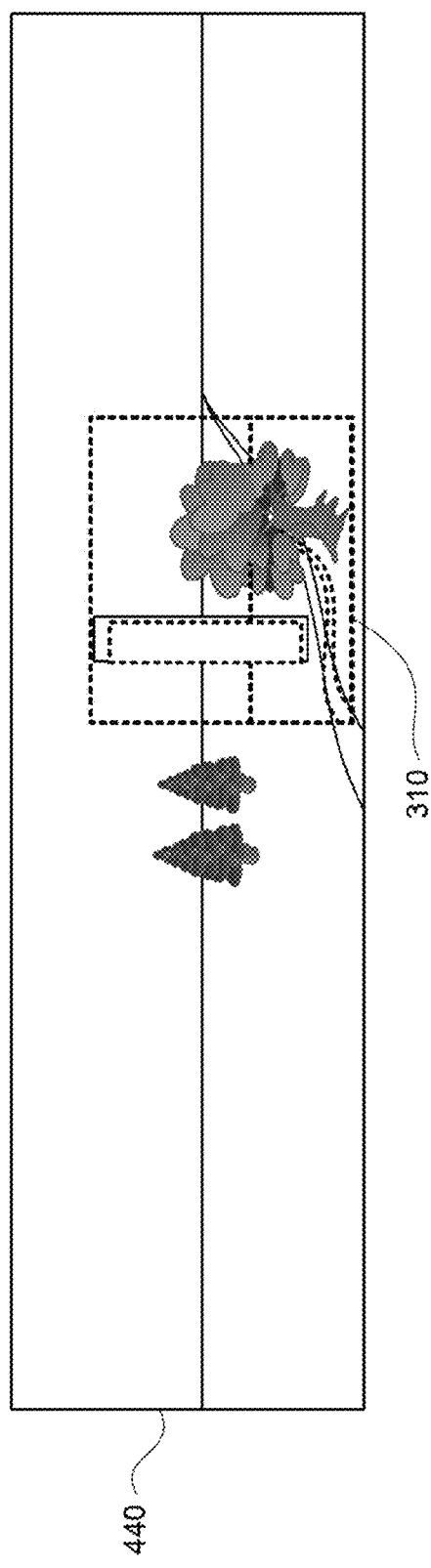

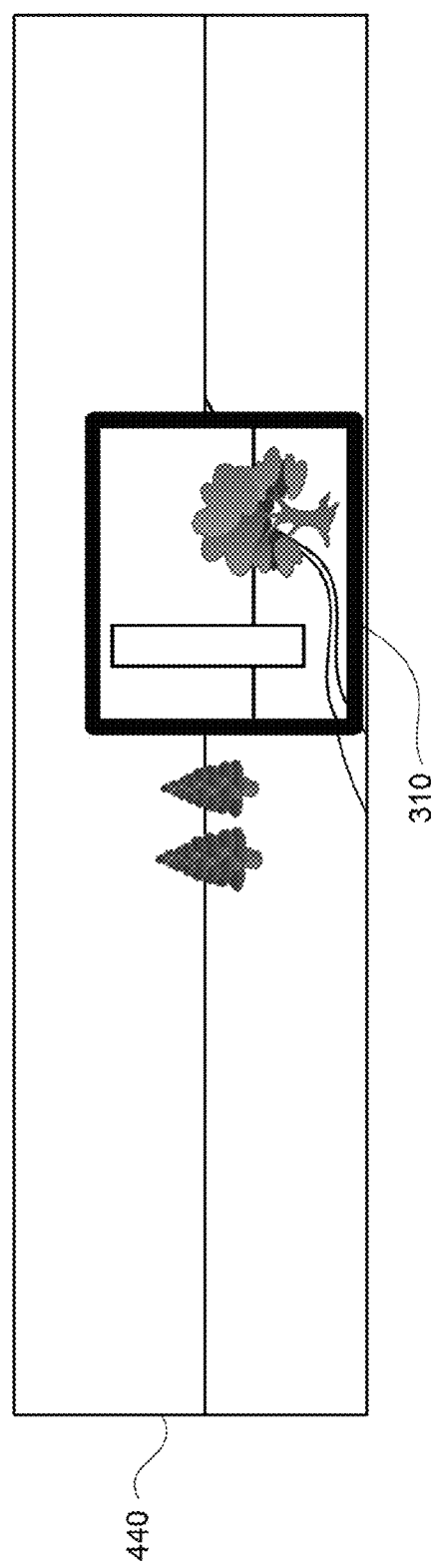

EXPANDING THE FIELD OF VIEW OF PHOTOGRAPH

BACKGROUND OF THE INVENTION

Photographs taken from everyday cameras have a limited field of view. Often, the field of view of an image captured by a typical camera is smaller than that of the human eye. The field of view of a panorama, on the other hand, is generally wider. For example, panoramic images may capture a field of view which is greater than that of the human eye, e.g., 180° or greater. Some panoramic images may capture all 360° around a center of projection.

BRIEF SUMMARY OF THE INVENTION

Aspects of this disclosure provide a method that includes receiving, by one or more computing devices, a request for expanded field of view of a first image; identifying, by the one or more computing devices, visual features in the first image; comparing, with the one or more computing devices, the visual features in the first image with visual features in one or more second images of larger field of view; selecting, by the one or more computing devices, based at least in part on the comparison of visual features, one or more of the second images; and determining, by the one or more computing devices, alignment information of the first image to each of the one or more selected second images.

In one example, the second images are panoramic images. In another example, the method also includes determining alignment information for the first image to each of the one or more second images by computing a transformation of the first image. In this example, the method may also include sending alignment instructions in accordance with the computed transformation to a client computing device to generate one or more composite images or render the first image with the one or more second images.

In another example, the method also includes generating one or more composite images using the first image and at least one of the selected second images and sending the one or more composite images to a client computing device for display. In this example, the method may also include generating one or more composite images by computing an alignment score for each alignment of the first image to each of the one or more second images and selecting the one of the one or more second images based on the alignment score. Also in this example, the method may also include generating the one or more composite images by applying one or more styling options to the one or more composite image. In this example, the one or more styling options may include blending the first image into the second image, adding a drop shadow under the first image, and/or adding a border to the first image.

Other aspects of the disclosure provide a system for determining alignment information of a first image to at least one second image, the system comprising one or more computing devices configured to receive a request for expanded field of view of the first image; identify visual features in the first image; compare the visual features in the first image with visual features in one or more second images of wider field of view; select, based at least in part on the comparison of the visual one or more of the second images; and determine alignment information of the first image to each of the one or more selected second images.

In one example, the second images are panoramic images. In another example, the one or more computing devices are also configured to determine the alignment information of the first image to each of the one or more selected second images by computing a transformation of the first image. In this example, the one or more computing devices may also send alignment instructions in accordance with the computed transformation to a client computing device to generate a composite image or render the first image with the one or more second images.

In another example, the one or more computing devices are also configured to generate one or more composite images using the first image and at least one of the one or more selected second images and send the one or more composite images to a client computing device for display. In this example, the one or more computing devices are also configured to compute an alignment score for each alignment of the first image to each of the one or more selected second images based on a quality of each alignment and select one of the one or more selected second images based on the alignment score. Also in this example, the one or more computing devices are also configured to apply one or more styling options to the one or more composite images. In this example, the one or more styling options may include blending the first image into the panorama, adding a drop shadow under the first image, and/or adding a border to the first image.

Further aspects of the disclosure provide a non-transitory computer-readable medium on which instructions are stored, the instructions, when executed by one or more computing devices cause the one or more computing devices to perform a method for generating one or more composite images, the method comprising receiving a request for expanded field of view of a first image; identifying visual features in the image; comparing the visual features in the first image with visual features in one or more second images of wider field of view; selecting, based on a comparison of the visual features, one or more of the second images; determining alignment information of the first image to each of the one or more selected second images; and generating the one or more composite image using the first image and at least one of the one or more selected second images.

In one example, the method also includes aligning the first image to each of the one or more selected second images by computing a transformation of the first image. The transformation of the image includes at least one of a translation, a rotation, a modification of a focal length, an application of homography, and a scaling.

In another example, the method of generating the one or more composite images also includes computing an alignment score for each alignment of the first image to each of the one or more selected second images based on a quality of each alignment and selecting one of the one or more selected second images based on the alignment score.

In yet another example, the method also includes storing the one or more composite images in association with a corresponding location; and retrieving at least one of the composite images from the memory for display to the client computing device.

BRIEF DESCRIPTION OF THE DRAWINGS

FIG. 5 is an example of a possible alignment of the image of FIG. 3 and the panoramic image of FIG. 4B in accordance with aspects of the disclosure.

FIG. 6 is an example of a composite image according to one aspect of the disclosure.

DETAILED DESCRIPTION

Overview

Figure 1:
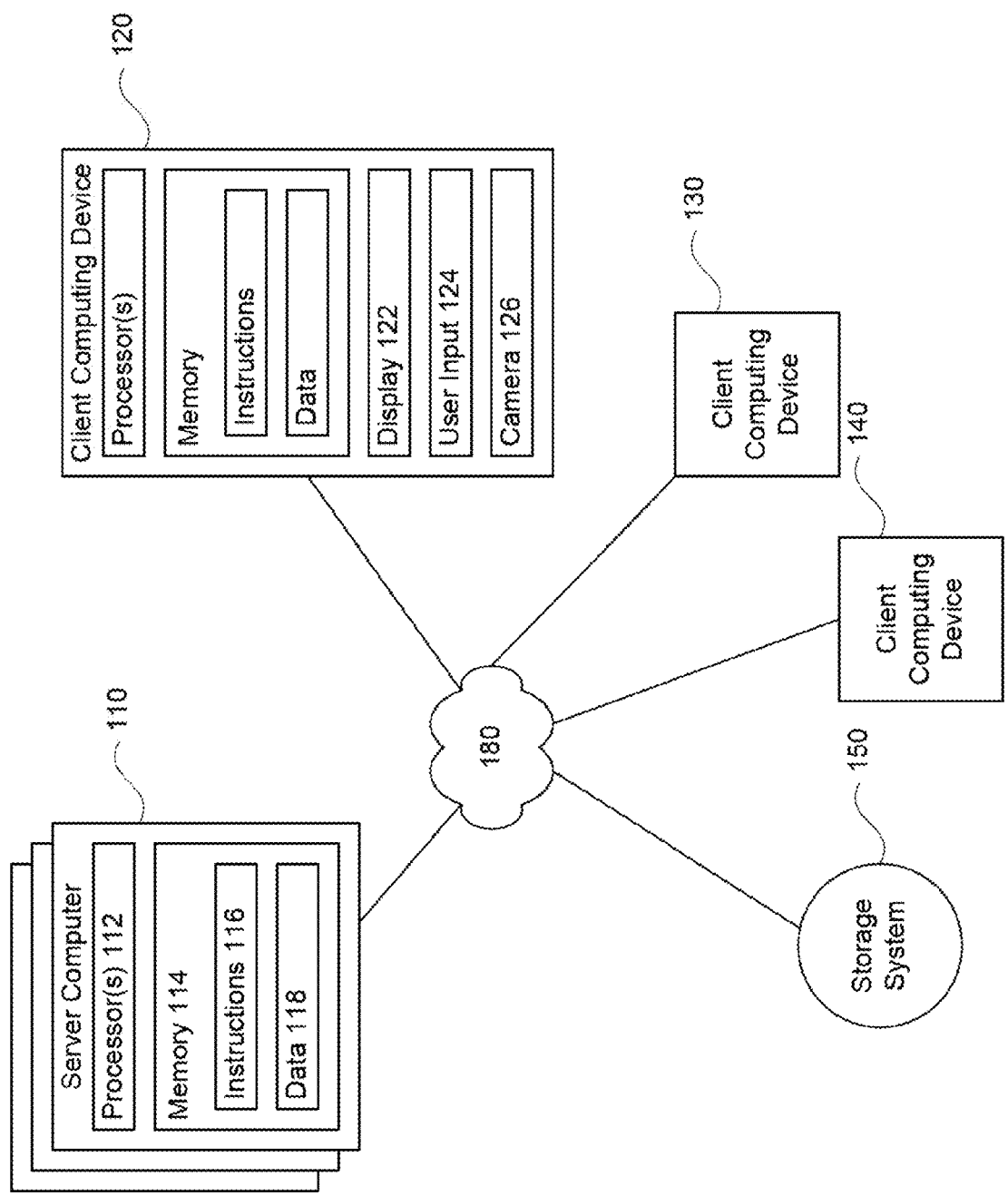
FIG. 1 is a functional diagram of an example system in accordance with aspects of the disclosure.

The technology relates to creating a composite image comprising a first image and a second image having a wider field of view than the first image (e.g., a panoramic image). In this regard, a user may be able to view the surroundings of the first image visible in a corresponding second image, thereby expanding the original field of view of the first image. Additionally, a user may navigate the corresponding second image to view the surrounding areas. In order to provide such composites, a first image may be matched with corresponding second image using the location information associated with, and the detected features of, the images. These images may be considered a smaller-larger image pair.

To create an effect of viewing images in the context of their immediate surroundings, a first image may be aligned with a corresponding second image by computing and performing a transformation to align the detected features of the first image to the corresponding features in the second image. An alignment score may be computed for each smaller-larger image pair to determine whether the pair is an acceptable composite image. The smaller-larger image pair with the highest alignment score may be presented to the user and/or stored for future viewing.

In one example use case, a user image (e.g., a picture taken by the user using a camera or phone), here an example first image, may have its field of view expanded by matching visual features in the user image with visual features of one or more panoramas, here example second images. The user image and the panorama may be aligned, and possibly transformed to match their visual features.

In order to generate a composite image of a given first image and an image with a wider field of view, a first image may be accessed. For example, the first image may include landscapes, landmarks, a building, a room, etc. The image file of the first image may be associated with other information, such as an image identifier that can be used to retrieve the first image, the time the image was created, an angle from which the first image is being viewed, an image format, and location information. The first image may then be processed to identify visual features in the image. Visual features may include lines, shapes, patterns, etc. and the arrangement of those lines, shapes and patterns in the image.

After processing the first image, a plurality of second images having similar visual features as the first image may be retrieved. These second images may be images having wider field of view than the first image; therefore appearing to depict a larger area. For example, a storage system such as a database or other such storage may contain images such as panoramas having a wider field of view than the first image. The visual features of these images of the storate system may be analyzed for similarities with the visual features of the first image. If the visual features of a given image of the storage system match those of the first image to a certain degree, the given image may be included in the plurality of second images that is retrieved from the storage system.

Additionally or alternatively, location information associated with the first image and the images of the storage system may be used to narrow the search for second images with similar visual features and/or may be used to filter the results of the search. Furthermore, retrieving the second images may include searching only those images of the storage system with a wider field of view than the first image or filtering the images of the storage system to only include images that are larger than the first image.

The first image may be aligned to each of the plurality of second images. This may be accomplished by matching the visual features of the first image to the corresponding visual features in each of the second images as smaller-larger image pairs. Alignment may consist of a translation of the first image, a relative rotation of the first image, a scaling of the first image, a modification of a focal length of the first image, a nomography, a similarity transform, another two-dimensional (2D) or three-dimensional (3D) transform, or some combination of these processes. Aligning the first image to a second image may include computing a transformation for the first image. This computation may occur multiple times, refining the alignment with every computation. Further, an alignment score may be computed for each smaller-larger image pair based on the quality of the alignment. Some of the smaller-larger image pairs may have lower alignment scores due to visual features that are not well-aligned due to a larger difference in camera poses.

A composite image may then be created using the smaller-larger image pair with the highest alignment score. The resulting composite image may be sent to a client computing device for display or stored in a storage system for future viewing. Additionally or alternatively, instructions for aligning the first image to the larger image may be sent to a client computing device such that the client computing device may be able to either generate the composite image or render the first image aligned with the larger image for display.

The features described herein may allow for an image to be composited with an image having a wider field of view than the first image, such as a panorama, therefore displaying the image in the context of the surrounding environment. A user may provide an image for compositing with an image having a wider field of view and share the resulting composite with others or navigate the composite image to virtually revisit the area in the image. Specifically, compositing an image with a panorama, and not another perspective image, may allow for an easier and more robust process of creating an attractive composite because panoramas capture the full field of view from a given point with consistent lighting and appearance. As such, these features may create composite images that produce the effect of expanding the field of view of the image.

EXAMPLE SYSTEMS

Figure 2:
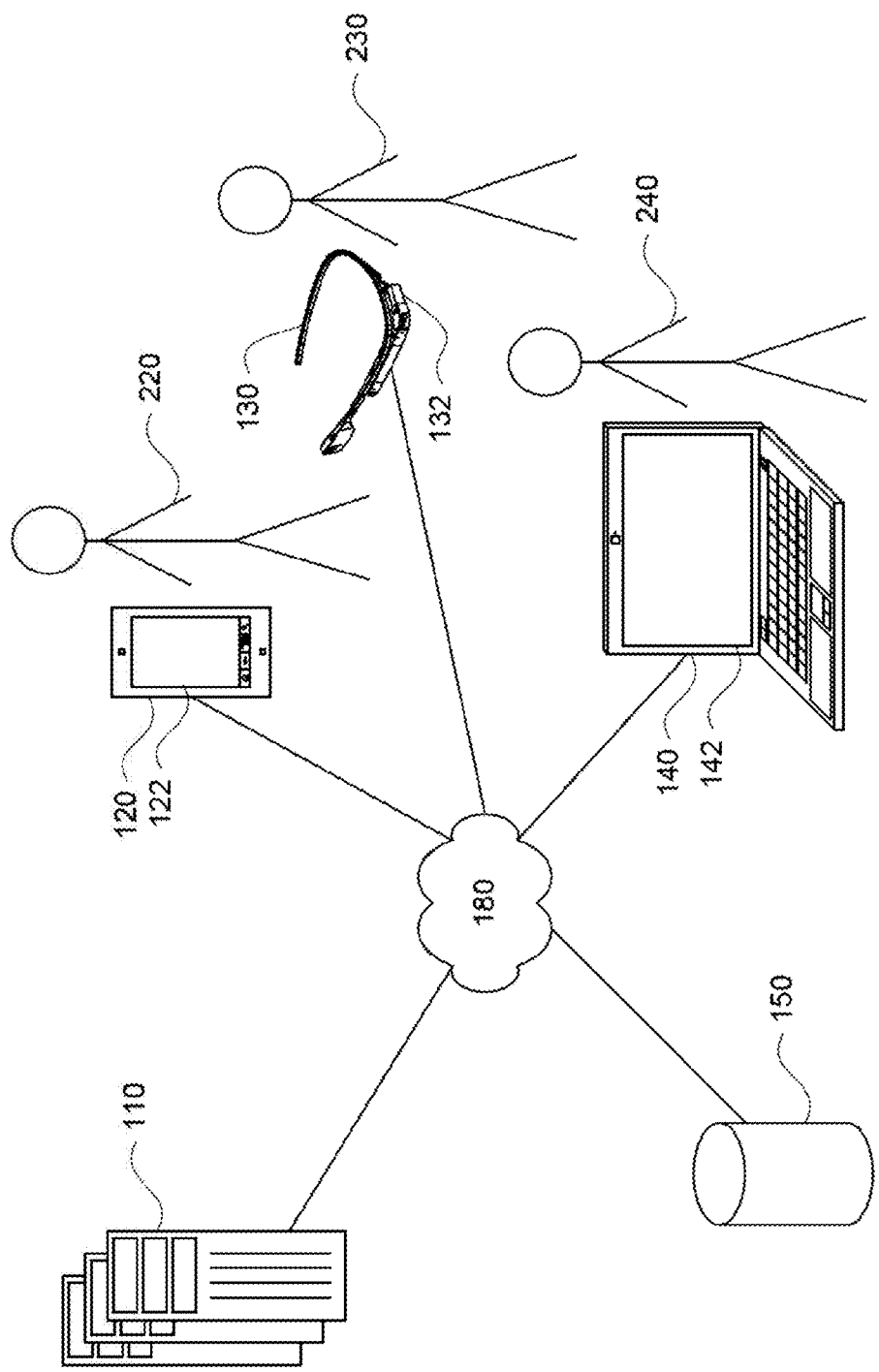
FIG. 2 is a pictorial diagram of the example system of FIG. 1.

FIGS. 1 and 2 include an example system 100 in which the features described above may be implemented. It should not be considered as limiting the scope of the disclosure or usefulness of the features described herein. In this example, system 100 can include computing devices 110, 120, 130, and 140 as well as storage system 150. Computing device 110 can contain one or more processors 112, memory 114 and other components typically present in general purpose computing devices. Memory 114 of computing device 110 can store information accessible by processor 112, including instructions 116 that can be executed by the processor 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read only memories.

The instructions 116 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Data 118 can be retrieved, stored or modified by processor 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can include any conventional processors, such as a commercially available CPU. Alternatively, the processor can be a dedicated component such as an ASIC or other hardware-based processor. Although not necessary, computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in a housing different from that of computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm. Yet further, although some functions described below are indicated as taking place on a single computing device having a single processor, various aspects of the subject matter described herein can be implemented by a plurality of computing devices, for example, communicating information over network 160.

The computing devices 110 can be at various nodes of the network 160 and capable of directly and indirectly communicating with other nodes of the network 160. Although only a few computing devices are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, computing devices 110 may include one or more web servers that are capable of communicating with storage system 150 as well as computing devices 120, 130, and 140 via the network. For example, referring to FIG. 2, server computing devices 110 may use network 180 to transmit and present information to a user, such as user 220, 230, or 240, on a display, such as displays 122, 132, or 142 of computing devices 120, 130, or 140. In this regard, computing devices 120, 130, and 140 may be considered client computing devices and may perform all or some of the features described below.

Each of the client computing devices 120-140 may be configured similarly to the server computing devices 110, with one or more processors, memory and instructions as described above. Each client computing device 120, 130 or 140 may be a personal computing device intended for use by a user 220, 250, 250, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touch screen or microphone). The client computing device may also include a camera for recording video streams, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

Storage system 150 may store images. At least some of these images may be images having a limited field of view, such as an image captured by a point-and-shoot camera. Some other images may be panoramic images having a field of view which is greater than that of the human eye, e.g., 180 degrees or greater. As discussed herein, the generated composite images may also be stored. In addition to images, storage system 150 may also store information associated with those images such as image identifiers, timestamps, pose information, image format, location information (e.g., geotag), and an index of features of the image.

As with memory 114, storage system 150 can be of any type of computerized storage capable of storing information accessible by server 110, such as a hard-drive, memory card, ROM, RAM, DVD, CD-ROM, write-capable, and read-only memories. In addition, storage system 150 may include a distributed storage system where data is stored on a plurality of different storage devices that may be physically located at the same or different geographic locations. Storage system 150 may be connected to the computing devices via the network 180 as shown in FIG. 1 and/or may be directly connected to or incorporated into any of the computing devices 110-140.

Example Methods

Figure 3:
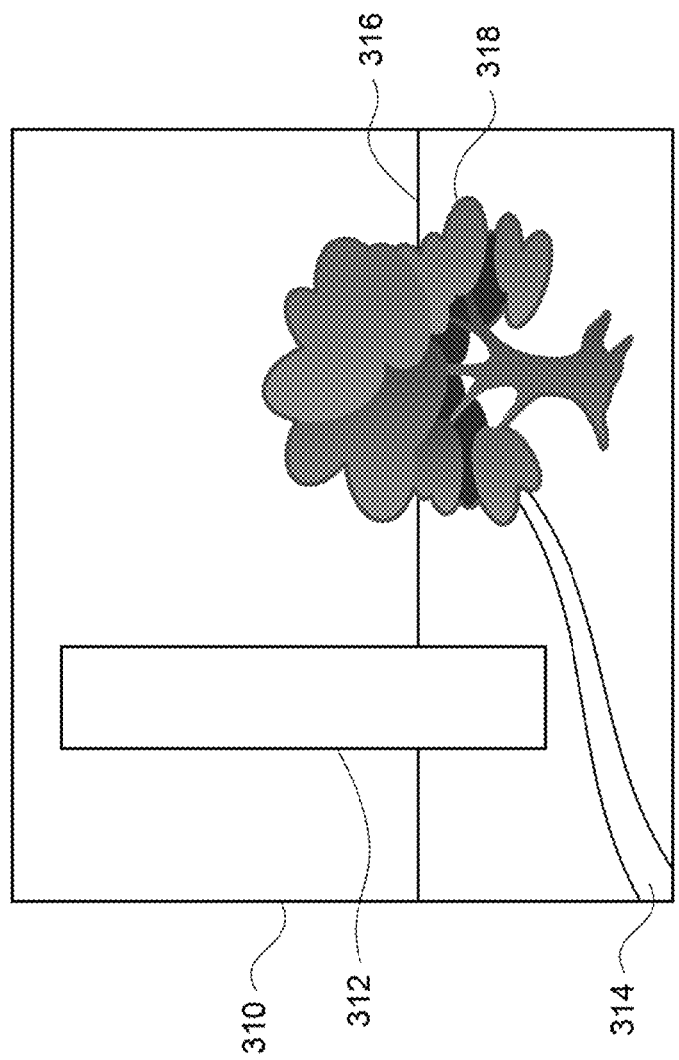
FIG. 3 is an example of an image with a small field of view.

FIG. 3 illustrates a first image of a given location, which may be used to form the composite image. An image of a specific location may be accessed. The image may be received through user input or retrieved from a storage system such as storage system 150. Such an image may include landscapes, landmarks, a building, a room, or any other objects. For example, an image 310 for a specific location may include a monument 312, a river 314, a horizon 316, and a tree 318, as shown in FIG. 3. An image may be associated with other information, such as an image identifier, a timestamp, pose information including the angle from which the image was taken, image format (JPEG, TIFF, etc.), and location information. The location information may include a geotag or latitude and longitude coordinates.

The image that is received or retrieved may be processed to identify visual features in the image. Visual features may include lines, shapes, patterns, etc. and the arrangement of those lines, shapes, and patterns in the image. An image may be associated with an index of features that categorize the visual features in an image based on type and placement in the image. In the example of FIG. 3, visual features that define the edges and sides of the monument 312, the shape of the path of the river 314, the placement of the horizon 316, and the shape and the texture of the tree 318 may be identified with respect to image 310.

By comparing the visual features identified in this first image with the visual features of stored images, a plurality of second images, having wider fields of view than the first image, may be retrieved. In this regard, at least some of the images of the storage system 150 may be considered panoramic images. The images in the storage system 150 may also be associated with information, such as location information and indexes of visual features. The visual features of the panoramas may be analyzed for similarities with the visual features of the image. If the visual features of a given image of the storage system 150 match those of the first image to a certain degree, the given image may be included in the plurality of second images that is retrieved from the storage system.

Figure 4A:
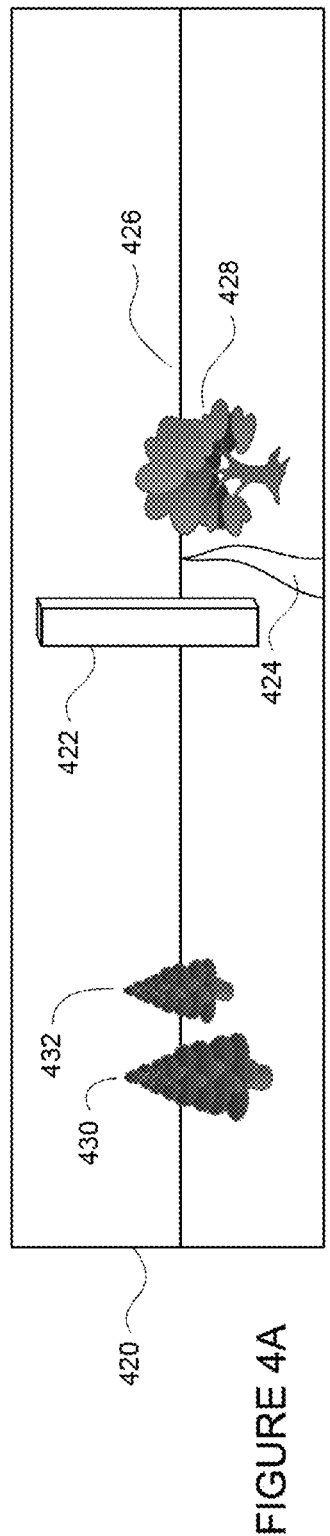
FIGS. 4A-C are examples of a set of panoramic images with a larger fields of view relative to the image in FIG. 3.
Figure 4B:
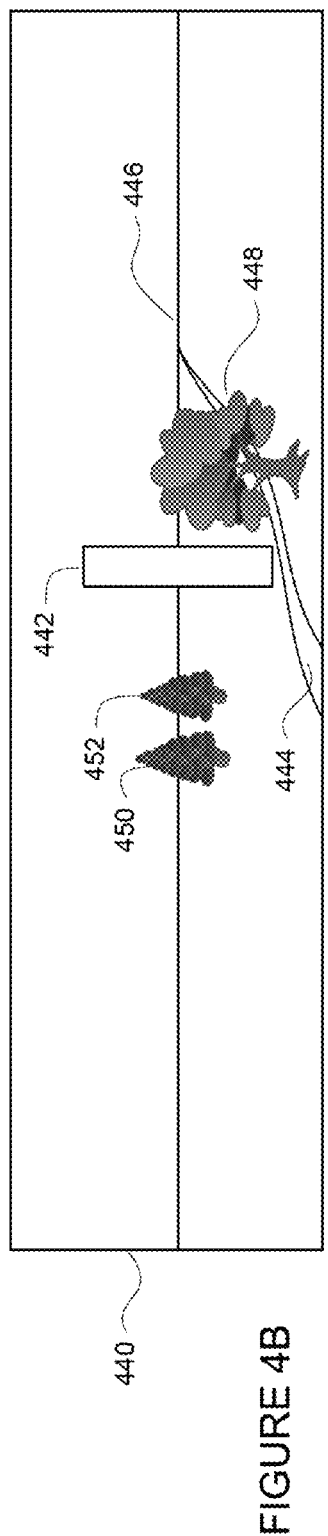
Figure 4C:
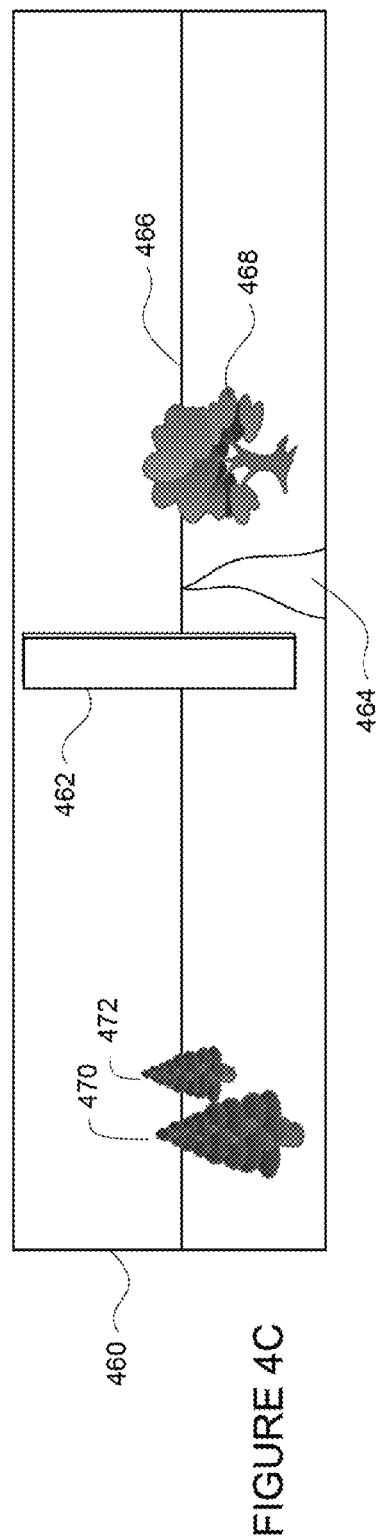

As shown in FIGS. 4A, 4B, and 4C, a number of panoramas 420, 440, and 460 that also include views of the monument, the river, the horizon, and the tree are retrieved from storage system 150 as second images to first image 310. While the panoramas 420, 440, and 460 include similar features to image 310, they do differ from image 310 in a variety of ways. For one, the panoramas 420, 440, and 460 include objects in its wider field of view not included in the narrower field of view of first image 310. For example, tree 430 and tree 432 shown in panorama 420 do not appear in image 310. Also, the pose and orientation of the panoramas differ 420, 440, and 460 from that of first image 310, causing the placement and orientation of the objects to differ as well. By way of example, river 424 from panorama 420 notably is almost perpendicular to the horizon 426, unlike river 314, which lies on a diagonal.

Location information may also be used to narrow the selection of the plurality of second images to the images of the storage system that are within a certain geographic proximity of the location of the first image. First image 310 and panoramas 420, 440, and 460 may all be geotagged with the location of the monument or a location nearby. The selection of similar images based on location may occur either before or after the comparison of visual features. Thus, in this example, at least panoramic images 420, 440, and 460 may be selected and retrieved as second images for first image 310 based on a combination of location information and analysis of features in the images.

Additionally or alternatively, one or more indexes of visual features may be used for comparing the first image and the images of the storage system 150. The indexes may be searched for key features to retrieve a subset of images of the storage system for more detailed comparison with the first image. As another alternative, a specified number of pixels of an image of the storage system that comprise the portion of the image of the storage system that matches the first image and the immediate surroundings may be retrieved. For instance, if a given image of storage system is a panorama that spans the 360° view from a specific point, the pixels that comprise the 180° centered around the specified pixels that match the first image may be retrieved, and not the full panorama.

The first image may be aligned to each of the plurality of second images that have sufficiently similar visual features. This may be accomplished by transforming the first image such that the visual features of the image are matched to the corresponding visual features in a second image. By way of example, first image 310 (shown in dashed-line for clarity here) has been placed in panorama 440 (a second image) where the first image's visual features are best aligned with those of panorama 440 as in FIG. 5. The monument, river, and tree of first image 310 generally overlap the monument, river, and tree of panorama 440 with some small deviations and differences.

Alignment may consist of translating the first image, rotating the first image, scaling the first image, changing the focal length of the first image, applying a nomography to the first image, performing a similarity transform on the first image, performing some other 2D or 3D transformation on the first image, or doing some combination of these processes relative to the second image. A 3D transformation may consist of treating the first image as a 2D plane floating in a 3D space, so the image may be warped in 3D space to best fit the second image behind it. Aligning the first image to a second image may also include computing a mathematical transformation for the image. This computation of may occur multiple times or in stages, refining the alignment with every computation. In other words, the incremental transformations may become smaller with each iteration of the computation. Alignment instructions may be generated based on the computed transformation(s).

For each smaller-larger image pair (e.g. each combination of a first image and a corresponding second image), an alignment score may be computed based on the quality of the alignment. If some visual features are poorly aligned in a smaller-larger image pair, the alignment score for that pair would be lower than a smaller-larger image pair with more visual features closely aligned.

As mentioned previously, poorly aligned features may be the result of a larger difference in pose or orientation. For example, because of the noticeable difference from first image 310 with respect to the placement of the river in panoramas 420 and 460, the alignment scores of the alignment between image 310 and panoramas 420 and 460 may be lower than the alignment score of the alignment between first image 310 and panorama 440. If none of the alignment scores of the smaller-larger image pairs meet a specified threshold, a message may be displayed indicating that a composite image cannot be created.

If one or more alignment scores meet the threshold, the smaller-larger image pair having a highest alignment score may be used to generate a composite image. FIG. 6 shows an example of the final composite image 600 with first image 310 in a second image (here panorama 440) at the first image's aligned position.

One or more styling options may be added to the composite image. Some examples of options include blending the first image and the second image, including a drop shadow of the first image over the second image, including a frame or a border around the first image in the second image, and adding a degree of transparency to the first image so that the second image is partially visible underneath. As shown in FIG. 6, a border has been added around first image 310. Furthermore, blending the first image and the larger image may comprise extracting out the foreground objects in the image and stitching the foreground objects in the image into the larger image using any number of blending methods.

Additionally or alternatively, the composite image also include facts about the depicted location that are displayed when a particular area of the image is clicked or navigation function for navigating within the composite image or neighboring images.

After generating the composite image, the created image may be sent to a client computing device for display or stored in a storage system such as storage system 150 for future retrieval. For example, referring back to FIG. 2, a user 220, 230, or 240 may name the resulting composite image 600 or edit it further and then save it to storage system 150 or a memory of server computer 110 or client computing device 120, 130, or 140. Based on user input or request, the composite image 600 may be retrieved and displayed on a client device 120, 130, or 140.

Alternatively, the first image may be rendered on top of the larger image in an image viewer rather than being stitched together to create a composite image. If that is the case, image 310 would be displayed on top of panorama 440 as shown in FIG. 6 in on a client computing device 120, 130, or 140 without creating composite image 600. User 220, 230, or 240 may still choose to save image 310 and panorama 440 as a single composite image 600 after viewing it.

Figure 7:
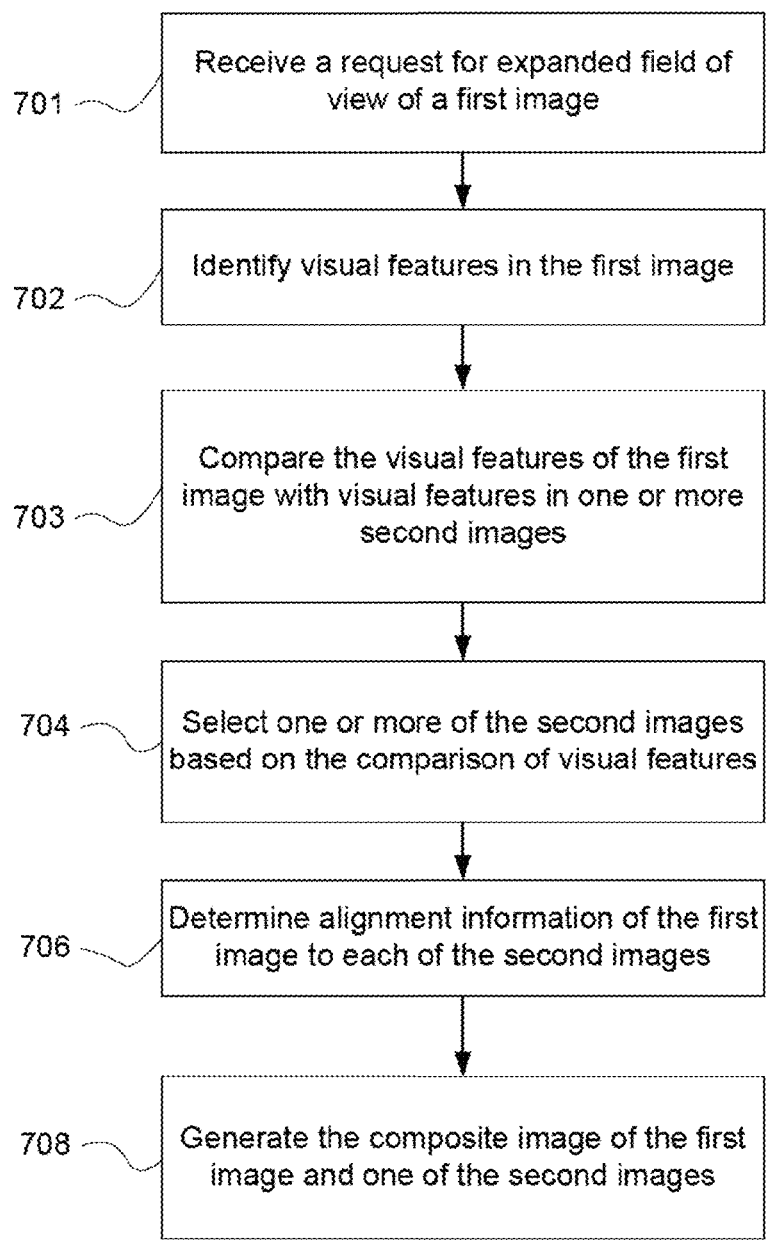
FIG. 7 is a flow diagram of an example method in accordance with aspects of the disclosure.

Flow diagram 700 of FIG. 7 is an example of some of the aspects described above which may be performed by one or more processors of a client computing device and/or one or more server computing devices as noted above. While FIG. 7 shows blocks in a particular order, the order may be varied and that multiple operations may be performed simultaneously. Also, operations may be added or omitted.

At block 701, a request for expanded field of view of a first image may be received. The first image may be associated with location information and an index of visual features.

At block 702, visual features of a first image are identified. Visual features may be identified by accessing the index and may include lines, edges, textures, colors, and other types of characterizations.

The visual features of the first image may be compared with visual features of a plurality of second images at block 703. The second images may also be associated with location information and an index of visual features. Included in the second images are images with a wider field of view than the first image, such as panoramas.

A plurality of second images may be selected based on a comparison of the visual features at block 704. Specifically, second images that have a wider field of view may be selected. The plurality of second images may include panoramas having visual features matching those of the first image to a sufficient degree may be selected from a storage system of various images having location information. This location information as well as location information associated with the first image may be used to select the plurality of second images as well.

At block 706, alignment information for the first image to each of the plurality of second images is determined. This may include computing a transformation of the image in relation to each of the plurality of second images. In addition, an alignment score may be assigned to each pairing of the first image with a given second image of the plurality of second images based on how well-aligned the features of the image and of the second image are.

At block 708, the composite image of the first image and one of the plurality of second images is generated. The composite image may be the first image stitched with the second image or a rendering of the first image on top of the second image.

The features described above may create a composite image of a first image and a second image, such as a panoramic image, of a given location. The result is the image displayed in the context of the surrounding environment. Additionally, because the first image is composited with a panoramic image and not another perspective image having a similar or narrower field of view of the first image, the effect created is one of expanding the field of view of the first image.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method comprising:
   receiving, by one or more processors, a request for expanded field of view of a first image;
   identifying, by the one or more processors, visual features in the first image;
   comparing, with the one or more processors, the visual features in the first image with visual features in a plurality of second images having a wider field of view than a field of view of the first image;
   selecting, by the one or more processors, based at least in part on the comparison of visual features, a subset of the plurality of second images;
   for each given second image in the subset, determining, by the one or more processors, an alignment for the first image relative to that second image;
   for each determined alignment, determining, by the one or more processors, an alignment score for that determined alignment that represents a quality of that determined alignment;
   selecting, by the one or more processors, a particular second image in the subset based on the alignment scores; and
   generating, by the one or more processors, a composite image depicting the first image in a foreground of the particular second image using the determined alignment for the particular second image to create the expanded field of view of the first image.

2. The method of claim 1, wherein the second images are panoramic images.

3. The method of claim 1, wherein determining the alignment for each given second image in the subset, further comprises computing a transformation of the first image.

4. The method of claim 3, further comprising sending alignment instructions in accordance with the computed transformation to a client computing device that sent the request for expanded field of view of the first image to generate one or more composite images or render the first image with the one or more second images.

5. The method of claim 1, further comprising
sending, by the one or more processors, the composite images for display on a client computing device that sent the request for expanded field of view.

6. The method of claim 5, wherein generating the composite images further comprises applying one or more styling options to the composite image.

7. The method of claim 6, wherein the one or more styling options comprise at least one of blending the first image into the second image, adding a drop shadow under the first image, or adding a border to the first image.

8. A system for determining alignment information of a first image to at least one second image, the system comprising one or more processors configured to:
receive a request for expanded field of view of the first image;
identify visual features in the first image;
compare the visual features in the first image with visual features in a plurality of second images having a wider field of view than a field of view of the first image;
select, based at least in part on the comparison of visual features, a subset of the plurality of second images;
for each second image in the subset, determine the alignment for the first image relative to that second image;
for each determined alignment, determine an alignment score for that determined alignment that represents a quality of that determined alignment;
select a particular second image in the subset based on the alignment scores; and
generate a composite image depicting the first image in a foreground of the particular second image using the determined alignment for the particular second image to create the expanded field of view of the first image.

9. The system of claim 8, wherein the second images are panoramic images.

10. The system of claim 8, wherein the one or more computing devices are further configured to determine the alignment for the first image to second image by computing a transformation of the first image.

11. The system of claim 10, wherein the one or more computing devices are further configured to send alignment instructions in accordance with the computed transformation to a client computing device to generate a composite image or render the first image with the one or more second images.

12. The system of claim 8, wherein the one or more computing devices are further configured to
send the composite image for display on a client computing device that sent the request for expanded field of view of the first image.

13. The system of claim 12, wherein the one or more computing devices are further configured to apply one or more styling options to the composite image.

14. The system of claim 13, wherein the one or more styling options comprise at least one of blending the first image into the second image, adding a drop shadow under the first image, or adding a border to the first image.

15. A non-transitory computer-readable medium on which instructions are stored, the instructions, when executed by one or more computing devices cause the one or more computing devices to perform a method for generating one or more composite images, the method comprising:
receiving a request for expanded field of view of a first image;
identifying visual features in the first image;
comparing the visual features in the first image with visual features in a plurality of second images having a wider field of view than a field of view of the first image;
selecting, based at least in part on the comparison of visual features, a subset of the plurality of second images;
for each given second image in the subset, determining an alignment for the first image relative to that second image;
for each determined alignment, determining an alignment score based on that determined alignment that represents a quality of that determined alignment;
selecting a particular second image in the subset based on the alignment scores; and
generating a composite images depicting the first image in a foreground of the particular second image using the determined alignment for the particular second image to create the expanded field of view of the first image.

16. The medium of claim 15, wherein determining an alignment for the first image relative to that second image further comprises computing a transformation of the first image, wherein the transformation of the first image comprises at least one of a translation, a rotation, a modification of a focal length, an application of homography, or a scaling.

17. The medium of claim 15, further comprising:
storing the composite images in association with a corresponding location; and
retrieving the composite image for display to a client computing device that sent the request for expanded field of view for the first image.

18. The method of claim 1, wherein determining the alignment for the particular second image comprises computing multiple transformations.

19. The method of claim 18, wherein the multiple transformations are calculated in stages, where a first transformation in a first stage is refined by a second transformation in a second stage after the first stage.

20. The method of claim 19, wherein the second transformation is smaller than the first transformation.

* * * * *